United States Patent
Ohsato et al.

(10) Patent No.: US 7,458,281 B2
(45) Date of Patent: Dec. 2, 2008

(54) MULTI-AXIS FORCE SENSOR CHIP AND MULTI-AXIS FORCE SENSOR USING SAME

(75) Inventors: Takeshi Ohsato, Wako (JP); Nobuhiro Sakurai, Wako (JP); Yusuke Hirabayashi, Wako (JP); Hiroshi Yokobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/256,982

(22) Filed: Oct. 25, 2005

(65) Prior Publication Data
US 2006/0086190 A1  Apr. 27, 2006

(30) Foreign Application Priority Data
Oct. 26, 2004  (JP)  ............ P2004-311145

(51) Int. Cl.
*G01L 1/22* (2006.01)
*G01D 7/00* (2006.01)
*G01L 1/04* (2006.01)

(52) U.S. Cl. ............ 73/862.044; 73/862.041; 73/862.623

(58) Field of Classification Search ............ 73/764, 73/862.014–862.045
See application file for complete search history.

(56) References Cited

U.S. PATENT DOCUMENTS

| | | | | |
|---|---|---|---|---|
| 4,295,117 A | * | 10/1981 | Lake et al. ............ 338/4 |
| 4,448,083 A | * | 5/1984 | Hayashi ............ 73/862.042 |
| 4,454,771 A | * | 6/1984 | Shimazoe et al. ............ 73/862.68 |
| 4,905,523 A | * | 3/1990 | Okada ............ 73/862.044 |
| 5,095,762 A | * | 3/1992 | Holm-Kennedy et al. ............ 73/862.041 |
| 6,148,671 A | * | 11/2000 | Nakamizo et al. ............ 73/514.34 |
| 2003/0140713 A1 | * | 7/2003 | Ohsato et al. ............ 73/862.041 |
| 2005/0081645 A1 | * | 4/2005 | Ohsato et al. ............ 73/862.041 |
| 2006/0174718 A1 | * | 8/2006 | Morimoto ............ 73/862.044 |
| 2007/0000335 A1 | * | 1/2007 | Morimoto ............ 73/862.045 |

FOREIGN PATENT DOCUMENTS

| EP | 0836151 A1 * | 4/1998 |
|---|---|---|
| EP | 1 327 870 A2 | 7/2003 |
| JP | 63-61609 B2 | 11/1988 |
| JP | 2746298 B2 | 2/1998 |
| JP | 2003-207405 A | 7/2003 |

* cited by examiner

*Primary Examiner*—Edward Lefkowitz
*Assistant Examiner*—Jonathan Dunlap
(74) *Attorney, Agent, or Firm*—Birch, Stewart, Kolasch & Birch, LLP (57) ABSTRACT

A multi-axis sensor chip provided by the invention includes a semiconductor substrate having an action part having an external force action area part and non-deforming area parts, a support part supporting the action part, and connecting parts connecting the action part to the support part. The sensor chip also has strain resistance devices provided on deforming parts of the connecting parts and has temperature-compensating resistance devices provided on the non-deforming area parts. Temperature compensation is carried out exactly by means of the temperature-compensating resistance devices when an external force or a load acts on the action part, and highly accurate stress detection can be carried out.

30 Claims, 9 Drawing Sheets

MULTI-AXIS FORCE SENSOR CHIP AND MULTI-AXIS FORCE SENSOR USING SAME

FIELD OF THE INVENTION

The present invention relates generally to a multi-axis force sensor chip and a multi-axis force sensor using the same and, more particularly, to a multi-axis force sensor chip and multi-axis force sensor using the same, having multiple strain resistance devices formed on a substrate using semiconductor manufacturing processes and suited to a six-axis force sensor to be used as a force-sensing sensor of a robot or the like.

BACKGROUND OF THE INVENTION

In an automatic tasking machine such as a machine tool or a robot, in the course of its working movements it will apply forces to workpieces and be subject to actions of forces from outside. In this case, the automatic working machine is required to detect forces and moments acting on it from outside and to perform control corresponding to these forces and moments. And to perform control corresponding to forces and moments with high accuracy, it is necessary to detect the forces and moments acting from outside exactly.

In this connection, various force-sensing sensors have been proposed in related art. Generally, force-sensing sensors can be classified by their detection methods into elastic-type force-sensing sensors and balance-type force-sensing sensors. An elastic-type force-sensing sensor measures an external force on the basis of an amount of deformation proportional to the force. A balance-type force-sensing sensor measures a force by balancing it with a known force.

Force-sensing sensors having as their principle structure a structure in which multiple strain resistance devices are provided on a part of a straining body that deforms elastically in correspondence with external forces are known. When an external force acts on the straining body of a force-sensing sensor, electrical signals corresponding to degrees of deformation (stress) of the straining body are outputted from the multiple strain resistance devices. And on the basis of these electrical signals it is possible to detect two or more components of force acting on the straining body. Measurement of the stress arising in the force-sensing sensor is carried out by calculation on the basis of the electrical signals.

One known force-sensing sensor is the six-axis force sensor. A six-axis force sensor is a kind of elastic-type force sensor, and has multiple strain resistance devices on straining body parts. A six-axis force sensor resolves an external force into stress components (forces Fx, Fy, Fz) in the axis directions of the three axes (X axis, Y axis, Z axis) of an orthogonal coordinate system and torque components (moments Mx, My, Mz) of the axis directions, and detects them as six axis components.

A first example of a six-axis force sensor of related art is the 'Multiple Force Component Load Cell' disclosed in JP-B-63-61609. The six-axis force sensor disclosed in this publication has a construction in which multiple strain gauges are affixed to a straining body with a three-dimensional structure. With a structure in which strain gauges are affixed to a straining body, there are problems such as that the scope for size reduction is limited; manufacturing reproducibility is poor and dispersion arises among products; and affixing layers detach due to stress of repeated impacts and thermal stresses and the like.

A second example of a six-axis force sensor of related art is the 'Device for Detecting Two or More Force Components' disclosed in Japanese Patent Publication No. 2746298. In a six-axis force sensor disclosed in this publication, multiple strain resistance devices are made on a semiconductor substrate using semiconductor manufacturing processes, and strain gauge elements are thereby provided integrally with a straining body part.

The six-axis force sensor of this second related art example structurally has the characteristic that when an attempt is made to detect a force or moment on each of three orthogonal axes, the whole substrate distorts isotropically, and also has the problem that the disposition of the multiple strain resistance devices on the substrate is not optimal and an external force acting on the straining body part cannot be resolved into components with good accuracy. In six-axis force sensors, when for example an external force is applied so that only an axial stress component Fx arises, if outputs are produced by stresses in connection with components other than Fx, which should properly be 0, exact force detection is impossible, and this is problematic.

Generally in a multi-axis force sensor the problem of not being able to resolve the axis components (forces and moments) of an external force acting on the straining body is known as the problem of 'other axis interference (cross-talk)'. This problem of other axis interference is one which cannot be ignored from the point of view of realizing a practical multi-axis force sensor.

As technology for solving this problem of other axis interference, the present inventors have proposed a six-axis force sensor having a new construction, in JP-A-2003-207405. In this six-axis force sensor, multiple strain resistance devices are integrally provided in a predetermined disposition pattern on parts of a straining body on a semiconductor substrate using semiconductor manufacturing processes.

This six-axis force sensor consists of a platelike semiconductor substrate having an approximately square plan shape, and is made up of a support part at its periphery, an approximately square action part positioned centrally, and connecting parts connecting the four sides of the action part to corresponding parts of the support part.

The strain resistance devices are provided at the boundaries between the sides of the square action part and the connecting parts. With this six-axis force sensor, the problem of 'other axis interference' is solved by improving the form of the straining body parts and optimizing the disposition pattern of the multiple strain resistance devices.

In the six-axis force sensor set forth in JP-A-2003-207405, because the strain resistance devices inherently have temperature-dependent characteristics, resistance devices for temperature compensation are provided on the semiconductor substrate. The temperature-compensating resistance devices are used for calculating a resistance ratio between a resistance value at room-temperature and an actual resistance value. By temperature-compensation of the resistance values of the strain resistance devices being carried out on the basis of the calculated resistance ratios and the surrounding temperature, the influence of the surrounding temperature is lowered and more accurate stress detection is made possible.

These temperature-compensating resistance devices are provided on the support part at the periphery of the semiconductor substrate. Because the temperature-compensating resistance devices are provided in positions away from the multiple strain resistance devices, the situation has arisen that thermal influences dependent on the substrate and interconnection parts such as heat conduction levels and thermal expansion levels are different between the areas where the strain resistance devices were disposed and the areas where the temperature-compensating resistance devices were disposed. And, stresses from the metal material and adhesive in the support part have also had an influence. As a result, there has been the problem that it the temperature compensation values of the temperature-compensating resistance devices do not necessarily assume the optimal values for performing output correction of the strain resistance devices.

On the other hand, when to make the temperature conditions the same the temperature-compensating resistance devices are disposed near the strain resistance devices, because the temperature-compensating resistance devices also distort under stress to the action part, and undergo resistance changes, the problem arises that they do not perform their temperature-compensating function.

SUMMARY OF THE INVENTION

In view of the problems described above, it is an object of the present invention to provide a multi-axis force sensor chip in which temperature-compensating resistance devices can be provided in positions where they are subject to the same thermal influences as the strain resistance devices and in positions where they are not subject to influences of stress, and with which it is possible to perform highly accurate stress detection.

It is another object of the invention to provide a multi-axis force sensor constructed utilizing a multi-axis force sensor chip that uses temperature-compensating resistance devices not subject to influences of stress and can perform highly accurate stress detection.

A first aspect of the invention provides a multi-axis force sensor chip including a base member having an action part having an external force action area part and non-deforming area parts, a support part supporting the action part, and connecting parts connecting the action part to the support part; strain resistance devices provided on deforming parts of the connecting parts; and temperature-compensating resistance devices provided on the non-deforming area parts of the action part.

Thus, with a multi-axis force sensor chip according to this invention, by temperature-compensating resistance devices for performing temperature compensation of the strain resistance devices for stress detection being provided on non-deforming area parts of the action part receiving the external force, the temperature-compensating resistance devices are brought close to the straining parts of the connecting parts without suffering the influence of stresses arising as a result of the external force, and their resistance values change only under the influence of temperature. That is, the temperature-compensating resistance devices are not caused to deform by stresses originating in the external force, they undergo the same influences (temperature state) of heat from the semiconductor substrate and interconnections as the strain resistance devices, and temperature compensation of the strain resistance devices is carried out with high precision. With this temperature-compensation the strain resistance devices can output detection values corresponding to stresses only. By this means a multi-axis force sensor chip according to the invention can perform highly accurate stress detection.

The base member is preferably a semiconductor substrate. In this case, the sensor chip can be manufactured using semiconductor manufacturing processes, the manufacturing process can be simplified, and it is possible to carry out volume production of sensor chips having the same performance with good reproducibility.

Preferably, the temperature-compensating resistance devices are provided on the non-deforming area parts in locations having equal temperature conditions to those of the deforming parts of the connecting parts. In this case, because the resistance values of the temperature-compensating resistance devices change only with the same temperature conditions as the strain resistance devices that they are temperature-compensating, it becomes possible for them to perform highly accurate temperature compensation.

Preferably, the action part has a plan shape similar to a square, four resistance device groups made up of strain resistance devices and temperature-compensating resistance devices are provided, and these four resistance device groups are disposed in correspondence with the four sides of the action part. In this case, the strain resistance device groups can be disposed in point-symmetrical positions on a square semiconductor substrate, and thereby noise can be canceled and computation load reduced.

Preferably, the strain resistance devices constituting the four resistance device groups are provided in a positional relationship of point symmetry about the center of the action part and substantially the same distance from that center. And preferably, the four resistance device groups made up of strain resistance devices and temperature-compensating resistance devices are provided in a positional relationship of point symmetry about the center of the action part and substantially the same distance from that center. In this case, when an applied external force is calculated in a signal processing part in a later stage on the basis of stress component signals from the strain resistance devices of the resistance device groups, a matrix computation can be carried out easily.

Preferably, each of the resistance device groups comprises at least two identical strain resistance devices and temperature-compensating resistance devices provided in correspondence with the number of these strain resistance devices. In this case temperature-compensation can be performed on all of the strain resistance devices, and it becomes possible to perform highly accurate stress detection and external force measurement.

Preferably, each of the resistance device groups comprises three identical strain resistance devices and three identical temperature-compensating resistance devices. In this case, more than in the case of the method of the multiple force component load cell of related art discussed above, miniaturization can be achieved and simple manufacture and computation and highly accurate stress detection become possible.

Preferably, the temperature-compensating resistance devices are disposed at a slant of 45° with respect to a centerline of the base part. In this case, taking into account the crystal orientation of the semiconductor substrate and the piezo-resistance devices, it is possible to markedly lower the piezo coefficient of the temperature-compensating resistance devices and to lower their stress sensitivity.

Preferably, each of the strain resistance devices and a corresponding one of the temperature-compensating resistance devices are connected so as to form a half a bridge circuit or a whole bridge circuit. When an electrical circuit for performing temperature-compensation is constructed by combining a strain resistance device and a temperature-compensating resistance device performing temperature-compensation for this in a bridge circuit and thereby at least half a bridge circuit is already formed by electrical circuitry provided within the sensor chip of the multi-axis force sensor chip, the construction of an external electrical circuit for measurement can be made simple. And when a whole bridge circuit is formed, the external circuitry can be made even simpler.

Preferably, a sensor chip according to the invention further includes differential amplifying parts, each for amplifying a difference signal between an output signal from the strain resistance device and an output signal from the temperature-compensating resistance device outputted by a respective one of the bridge circuits.

The invention also provides a multi-axis force sensor, including a multi-axis force sensor chip comprising a base member having an action part having an external force action area part and non-deforming area parts, a support part supporting the action part, and connecting parts connecting the action part to the support part, strain resistance devices provided on deforming parts of the connecting parts, and temperature-compensating resistance devices provided on the non-deforming area parts of the action part; a support plinth for supporting the multi-axis sensor chip by supporting the support part with a glass plinth; an attenuating mechanism; and transmitting means for applying an external force to the external force action area part of the action part.

With this multi-axis force sensor, because it is a sensor device using a multi-axis force sensor chip having the highly accurate stress detection characteristics described above, it is possible to realize a multi-axis force sensor having high detection performance. And because as a result of a glass plinth being used the residual stress between the plinth and the multi-axis force sensor chip decreases, the output reproducibility of the sensor increases and it is possible to perform more highly accurate stress detection.

Preferably, the attenuating mechanism has a shape with rotational symmetry about a center axis thereof. So that there is affinity in the combination of the sensor chip and the attenuating mechanism, it is desirable for the attenuating mechanism to be constructed so as to have rotational symmetry to go with the rotational symmetry of the sensor chip.

Preferably, the attenuating mechanism has a cylindrical shape. In this case, its ability to withstand loads can be made high. Also, by making the attenuating mechanism cylindrical it is possible to utilize its internal space efficiently, and the size of the attenuating mechanism can be made compact with respect to the sensor chip. And, because it is of a point-symmetrical shape, its axis force sensitivity is isotropic, and signal-processing becomes easy. However, the attenuating mechanism does not have to be cylindrical, and any shape can be employed that is rotationally symmetrical about a center-line of the attenuating mechanism.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
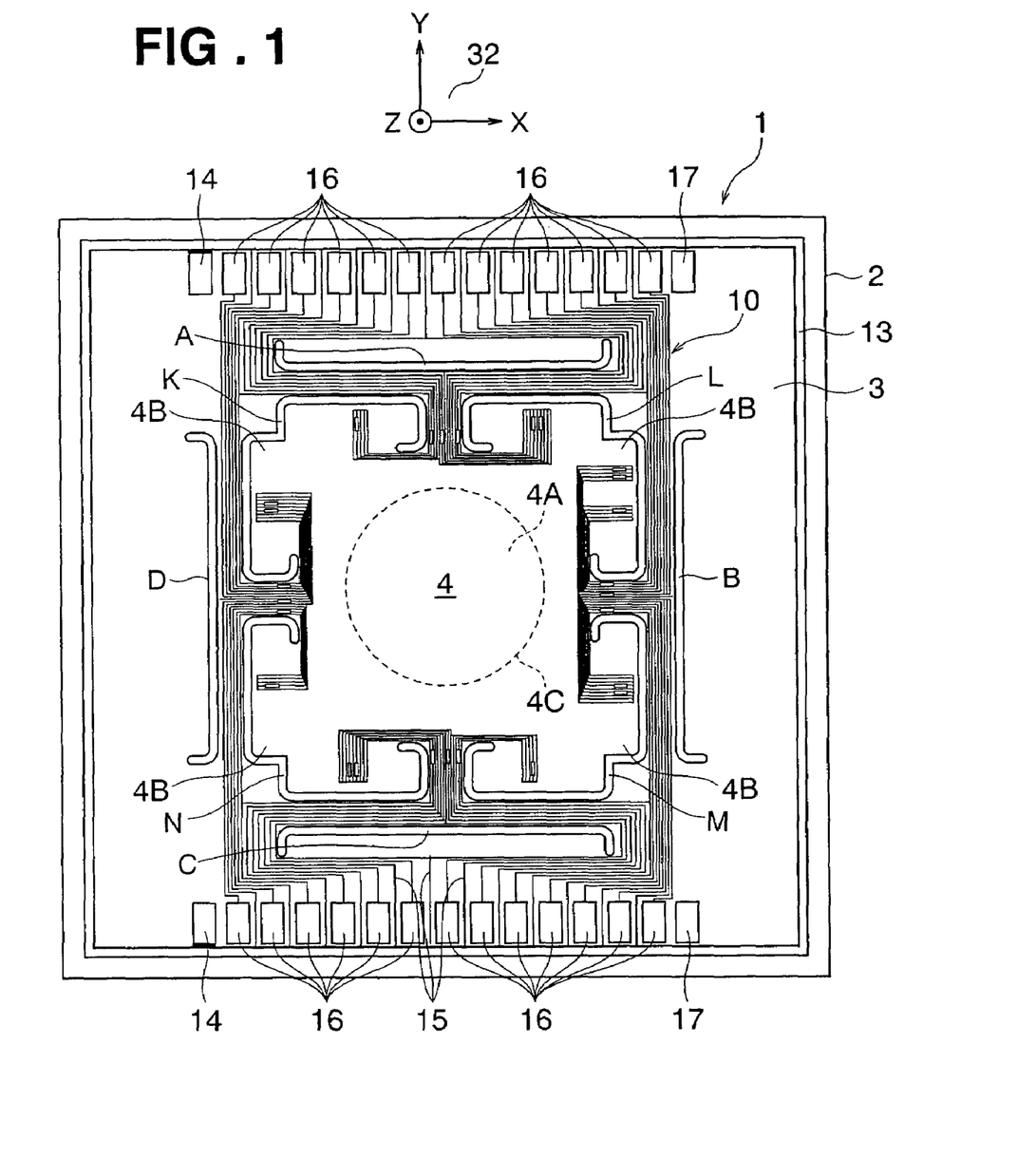
FIG. 1 is a plan view showing a six-axis force sensor chip constituting a representative example of a multi-axis force sensor chip according to the invention.
Figure 2:
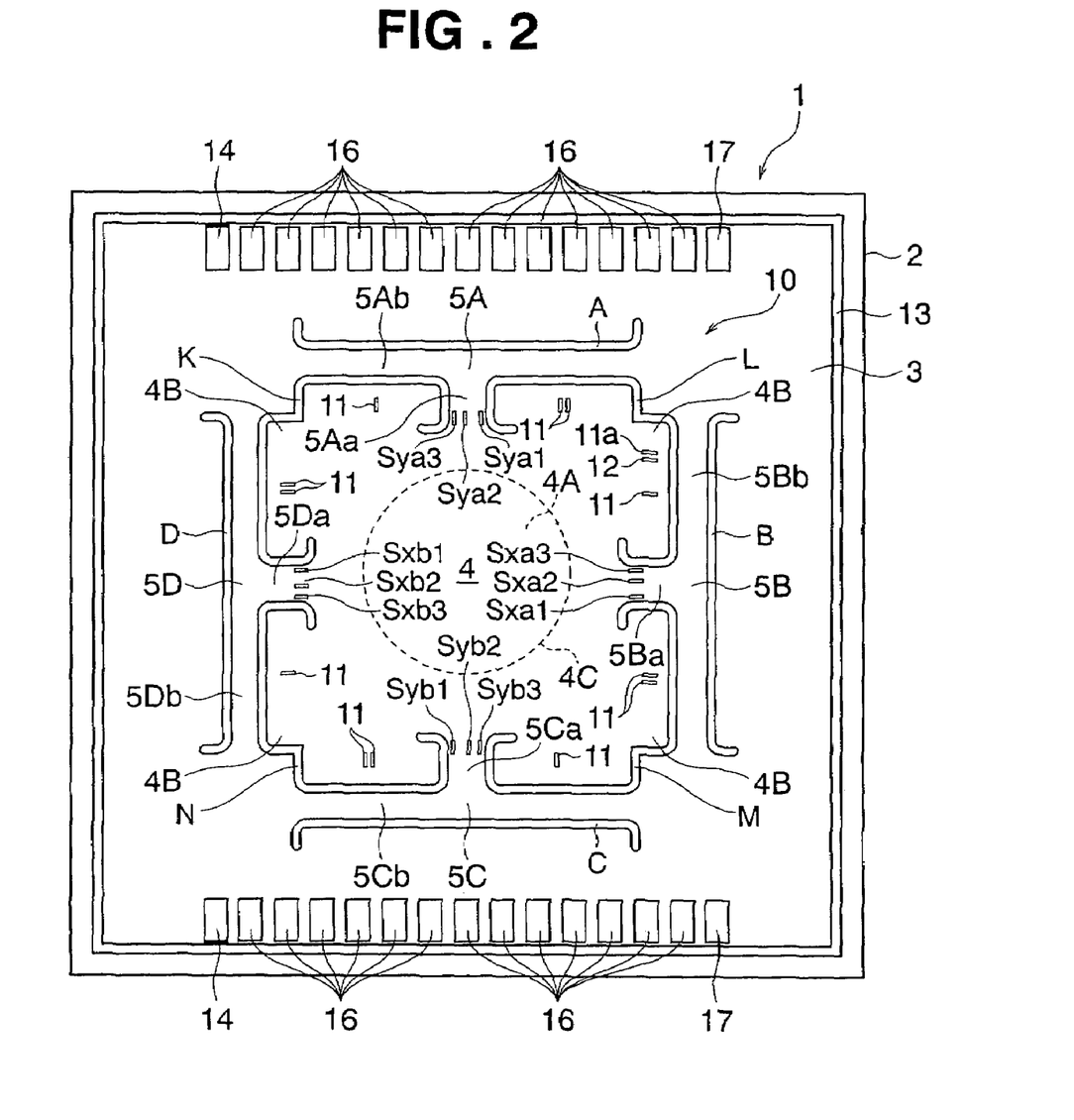
FIG. 2 is a plan view of a six-axis force sensor chip with an interconnection pattern in FIG. 1 omitted.
Figure 3:
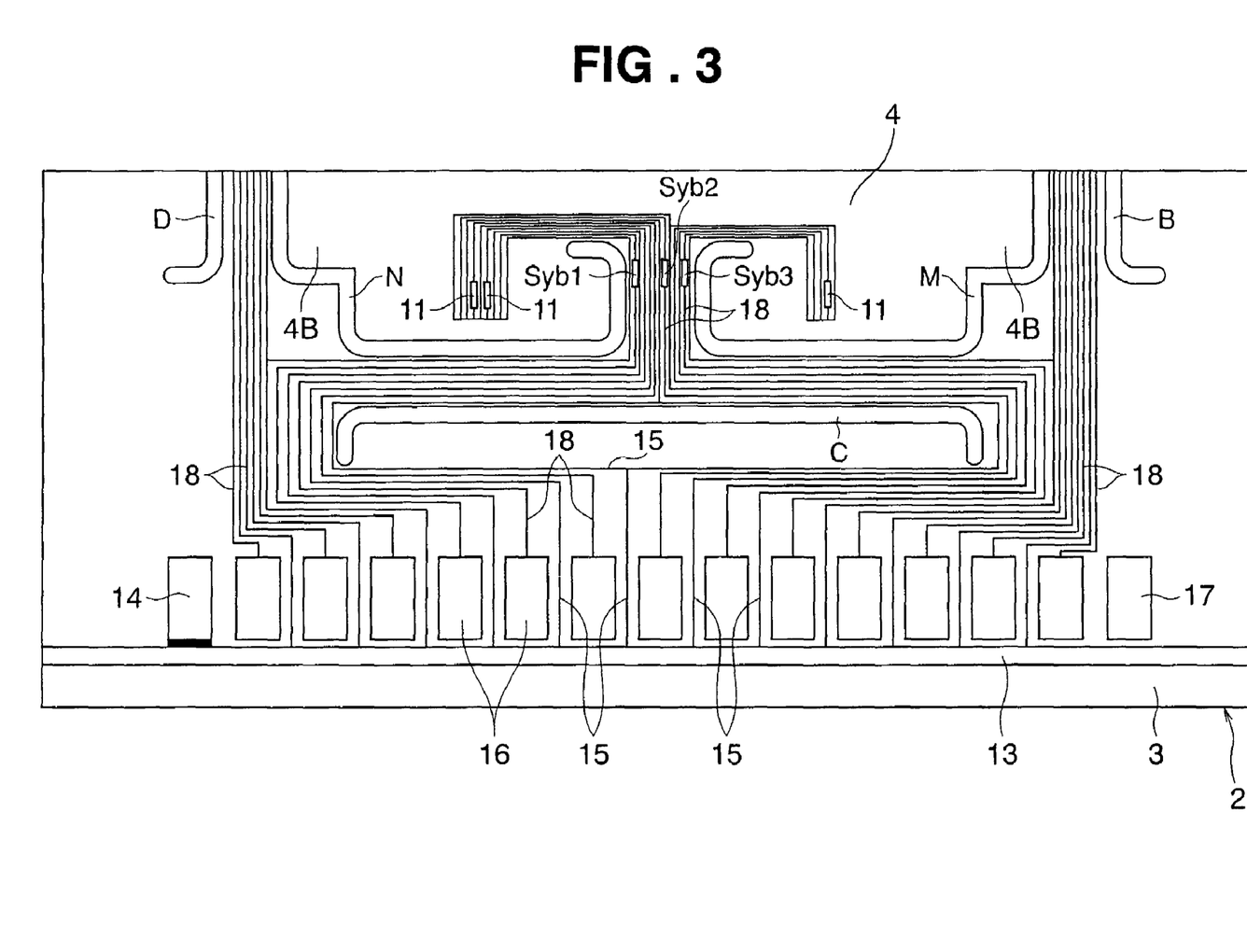
FIG. 3 is a partial enlarged plan view of the six-axis force sensor chip of this preferred embodiment.
Figure 4:
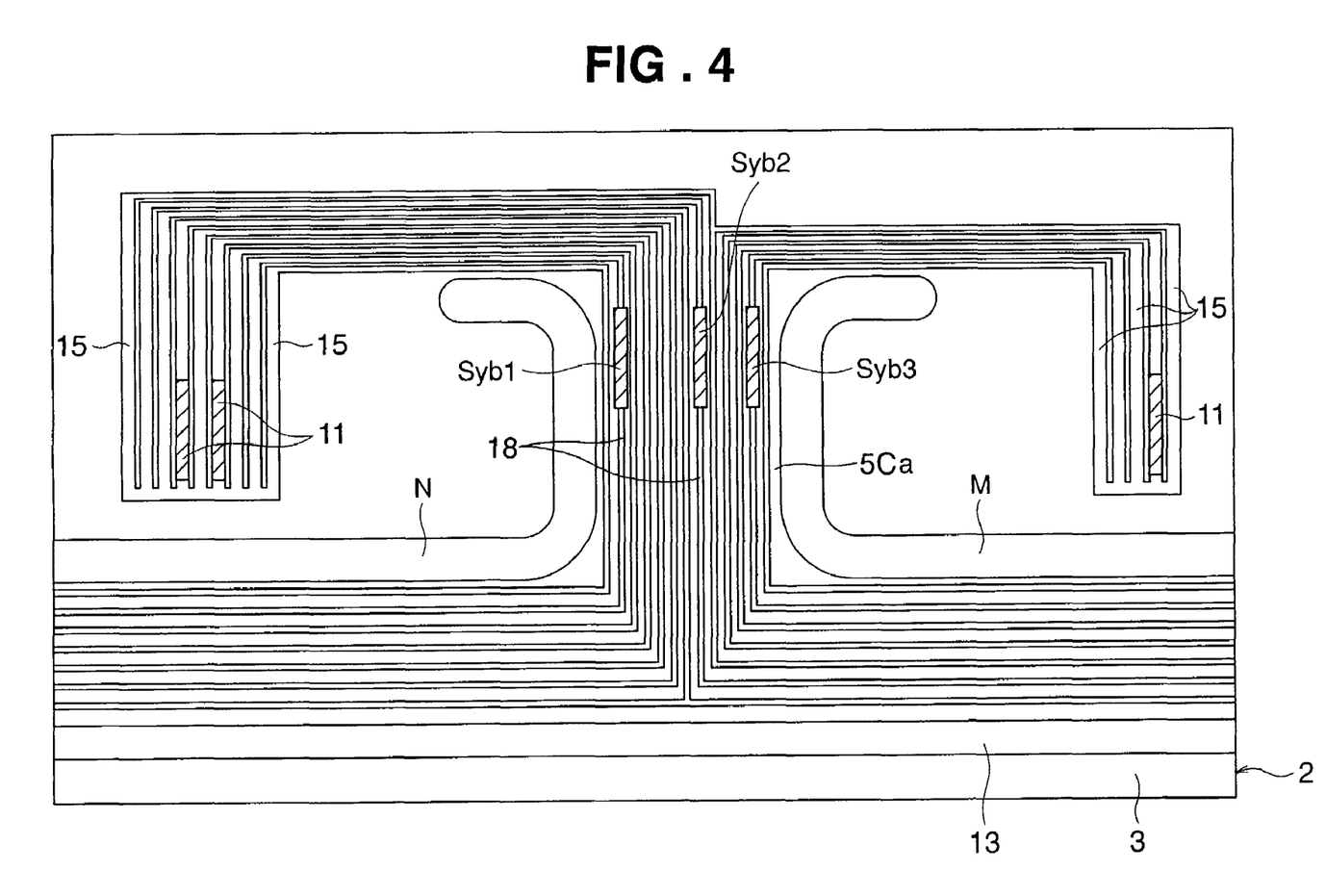
FIG. 4 is a partial enlarged plan view of a main part of the six-axis force sensor chip shown in FIG. 3.

A representative embodiment of a multi-axis force sensor chip according to the invention will now be described with reference to FIG. 1 to FIG. 4. In this embodiment, as a multi-axis force sensor chip, the example of a six-axis force sensor chip will be described. A multi-axis force sensor chip according to the invention is not limited to being a six-axis force sensor chip. FIG. 1 shows the six-axis force sensor chip in plan view; FIG. 2 shows the same six-axis force sensor chip with an interconnection pattern omitted, only strain resistance devices and electrode pads and holes being shown; FIG. 3 shows a peripheral part of one side of the square six-axis force sensor chip; and FIG. 4 shows one group of resistance devices and a structure of peripheral parts thereto.

The six-axis force sensor chip 1 shown in FIG. 1 and FIG. 2 is formed using a semiconductor substrate preferably square in plan view. The length of one side of this square semiconductor substrate is for example 5.5 mm. The substrate does not have to be a semiconductor substrate. The six-axis force sensor chip 1 has a platelike shape derived from that of the semiconductor substrate.

The six-axis force sensor chip 1, when the semiconductor devices are formed on the substrate, preferably, is made by applying semiconductor manufacturing technology (etching processes such as photolithography, resist patterning, ion injection, and film-forming processes such as P-CVD, sputtering, RIE) on one side of it to work the substrate itself and form the plan shape of the square semiconductor substrate and form necessary holes in it, and carrying out film-forming processes on a predetermined region of one surface of the semi-conductor substrate.

In this way the six-axis force sensor chip 1 of this preferred embodiment is formed as a semiconductor sensor device.

In the six-axis force sensor chip 1, a functional part for detecting six axis components as a six-axis force sensor is made up of twelve strain resistance devices (or piezo-resistance devices) Sxa1 to Sxa3, Sxb1 to Sxb3, Sya1 to Sya3 and Syb1 to Syb3, consisting of ion-injected active layers (or thermal diffusion layers) on one side of the semiconductor substrate 2. The total of twelve strain resistance devices are arranged in groups of three (Sxa1, Sxa2, Sxa3), (Sxb1, Sxb2, Sxb3), (Sya1, Sya2, Sya3), (Syb1, Syb2, Syb3) along the boundaries of four inverted T-shaped (or T-shaped) connecting parts 5A to 5D, which will be further discussed later, with an action part 4.

Also, temperature-compensating resistance devices 11 consisting of active layers (or thermal diffusion layers) are formed individually in correspondence with the twelve strain resistance devices Sxa1 to Sxa3, Sxb1 to Sxb3, Sya1 to Sya3 and Syb1 to Syb3 on the six-axis force sensor chip 1. One dummy resistance device 12 and a temperature-compensating resistance device 11a corresponding to this are also formed. In all, thirteen of the temperature-compensating resistance devices 11, 11a are formed. These temperature-compensating resistance devices 11 and the dummy resistance device 12 are disposed on four non-deforming area parts of the action part 4.

The dummy resistance device 12 is not essential to the construction of the invention. In this preferred embodiment, as the dummy resistance device 12, four dummy resistance devices 12 all having the same characteristics (of these, three dummy resistance devices are not shown) are prepared in advance and by means of these a bridge circuit (not shown) is formed, and the dummy resistance device 12 shown in FIG. 2 is used as a monitoring device so that a zero output state of when no stress is arising can be confirmed at all times.

As shown in FIG. 1 to FIG. 4, the semiconductor substrate 2 has holes A, B, C, D, K, L, M, N formed passing through it in the thickness direction of the plate material. The six-axis force sensor chip 1 is functionally divided up into a plurality of areas by the holes A, B, C, D, K, L, M and N.

The holes A, B, C, D, K, L, M and N all have the shape of a slit with a relatively narrow width. The holes A, B, C and D have the shape of an approximately straight slit, and the holes K, L, M and N have slit shape similar to an L-shape.

The semiconductor substrate 2 forming the six-axis force sensor chip 1 is made up of the action part 4, which is positioned in the center and has an approximately square plan shape; an approximately square frame-shaped support part 3, positioned so as to surround the action part 4; and the four T-shaped connecting parts 5A, 5B, 5C, and 5D, which are positioned between the action part 4 and the support part 3 and connect them together at their four sides. The action part 4 is formed by the holes K, L, M and N. The four T-shaped connecting parts 5A, 5B, 5C, and 5D are formed between the holes A, B, C, D and the holes K, L, M, N.

The locations where the strain resistance devices are disposed on the connecting parts do not necessarily have to be the locations where the most stress arises in the connecting parts. The strain resistance devices are disposed in optimal positions taking into account also various other factors such as their formation process and wiring routes.

In a semiconductor substrate 2 having the form described above, the support part 3 at its periphery is a part supported from its underside by a support plinth for example when it is assembled to a six-axis force sensor unit.

The action part 4 is a part for, when an external force or a load (hereinafter written 'external force') is transmitted to it from outside via a connecting rod or the like, directly receiving the action of the external force. This action part 4 is normally constructed to receive the external force at its center.

The connecting parts 5A, 5B, 5C, and 5D, when the action part 4 receives an outside force and undergoes a deformation or change of position, undergo a marked deformation or position change in connection with this, and among the support part, the action part and the connecting parts and so on they are the parts where the most stress arises (straining parts).

The action part 4 is made up of a central part (external force action area part) 4A to which an external force is applied or inputted, and four corner parts 4B equivalent to four corners positioned around the central part 4A. The circle 4C shown with a dashed line, as will be further discussed later, shows a linkage area to which a connecting rod for transmitting an external force to the action part 4 is connected. The diameter of the circle 4C is for example 1.6 mm. The outer edges of the four corner parts 4B of the action part 4 are formed as free ends by the holes K, L, M and N. Accordingly, the areas in the vicinities of the free ends of the four corner parts 4B are non-deforming area parts such that deformation does not arise in the parts themselves even when an external force acts on the central part 4A.

In the action part 4, the central part 4A is a part to which an external force is applied or inputted. The four connecting parts 5A to 5D around that, as shown in FIG. 2, each form an approximately T-shaped beam, and respectively have a bridge part 5Aa and an elastic part 5Ab, a bridge part 5Ba and an elastic part 5Bb, a bridge part 5Ca and an elastic part 5Cb, and a bridge part 5Da and an elastic part 5Db.

The elastic parts 5Ab, 5Bb, 5Cb and 5Db of the connecting parts 5A to 5D are each connected at both ends in the length direction to the support part 3, on the inner side of the respective hole A, B, C or D.

The bridge parts 5Aa, 5Ba, 5Ca, 5Da of the connecting parts 5A to 5D each have one length-direction end (an inner end) connected to a part equivalent to a side of the action part 4, and have the other end (an outer end) connected to the corresponding elastic part 5Ab, 5Bb, 5Cb or 5Db.

The connecting parts made up of the bridge parts and the elastic parts, the joining portions between the connecting parts and the action part, and the joining portions between the connecting parts and the support part, are formed integrally as the semiconductor substrate 2.

The joining portions between the bridge parts 5Aa, 5Ba, 5Ca, 5Da and the elastic parts 5Ab, 5Bb, 5Cb and 5Db and the joining portions between the bridge parts 5Aa, 5Ba, 5Ca, 5Da and the action part 4 are worked to a circular arc shape, preferably R-worked, to distribute stress caused by an external force applied to the action part 4 and give them strength with respect to the applied external force. The shapes of the holes A to D and K to N are not limited to those of this preferred embodiment.

The holes A to D, K to N are formed taking into account the size, number of strain resistance devices, and detectable stress range of the six-axis force sensor chip 1 so that strain arises the most markedly in the parts where the twelve strain resistance devices Sxa1 to Sxa3, Sxb1 to Sxb3, Sya1 to Sya3 and Syb1 to Syb3 are formed and so that strain does not arise at the positions of the temperature-compensating resistance devices 11 and their temperature conditions are equal to those at the twelve strain resistance devices. For example, the straight-line length of the end parts of the holes K to N (the part of the hole extending from the bridge part 5Aa to 5Da to the temperature-compensating devices) may be made longer than that shown in FIG. 1 and FIG. 2.

In the configuration example shown in FIG. 1 and FIG. 2, in the semiconductor substrate 2, the connecting parts 5A to 5D are formed in an approximate T-shape (T-shaped beam) by holes A, B, C, D, K, L, M, N formed passing all the way through the semiconductor substrate 2; however, as long as the necessary elastic function is fulfilled, they can alternatively be of some other shape such as Y-shaped.

As shown in FIG. 2, the strain resistance devices Sya1, Sya2 and Sya3 are formed in the vicinity of the joining portion between the action part 4 and the bridge part 5Aa. That is, the strain resistance devices Sya1, Sya2 and Sya3 are disposed on the part (straining part) of the connecting part 5A where strain occurs the most markedly when a stress corresponding to an external force applied to the action part 4 arises. And the strain resistance devices Sya1, Sya2 and Sya3 are formed in a line so as to be parallel with a uniform spacing in the width direction of the bridge part 5Aa. The middle strain resistance devices Sya2, Sxa2, Syb2 and Sxb2 are disposed on the length-direction centerlines of the respective bridge parts 5Aa, 5Ba, 5Ca and 5Da.

Like the strain resistance devices Sya1 to Sya3, The other strain resistance devices Syb1 to Syb3, Sxa1 to Sxa3, and Sxb1 to Sxb3 are also formed so as to be disposed respectively in the vicinity of the joining portion of the action part 4 and the bridge part 5Ca, in the vicinity of the joining portion of the action part 4 and the bridge part 5Ba, and in the vicinity of the joining portion of the action part 4 and the bridge part 5Da.

At the periphery of the semiconductor substrate 2, an approximately square frame-shaped GND (GROUND) interconnection 13 is formed to a required width along all the sides. Two GND electrode pads 14 are connected to the GND interconnection 13. Also connected to this GND interconnection 13 are multiple other, narrower GND interconnections 15 that function as guard rings as will be further discussed later.

Also, a total of twenty-six signal electrode pads 16 are formed along a pair of opposite sides of the semiconductor substrate 2. Thirteen signal electrode pads 16 are provided in a line along each of these sides.

Two electrode pads 17 are additional electrode pads. The additional electrode pads 17 are provided to make the potential over the face of the semiconductor substrate 2 uniform by being connected to an outside GND potential or bias potential. The additional electrode pads 17 do not have to be two in number and alternatively three or more may be provided. The square frame-shaped GND interconnection 13 shown in FIG. 1 and FIG. 2 is just one example, and any that will bring the substrate to a fixed potential wild do.

As shown in FIG. 3 and FIG. 4, in the vicinity of the joining portion between the connecting part 5C (see FIG. 2) and the action part 4, the strain resistance devices Syb1 to Syb3 consisting of active layers are formed in the length direction of the bridge part 5Ca. In the positional relationships of the strain resistance devices Syb1 to Syb3, the strain resistance device Syb2 is disposed in the approximate center of the bridge part 5Ca (on a centerline of the action part 4), and the strain resistance devices Syb1, Syb3 positioned on either side of that are preferably disposed in positions symmetrical about the strain resistance device Syb2 on the bridge part 5Ca.

The strain resistance devices Syb1 to Syb3 are provided by corresponding active layers being formed. Each of the strain resistance devices Syb1 to Syb3 has one end connected to one of the GND interconnections 15 and the other end connected to a signal interconnection 18.

The GND interconnections 15 are formed so as to be disposed between the signal lines 18 leading from the individual strain resistance devices Syb1, Syb2 and Syb3 and are formed so as to surround the individual active layers of the strain resistance devices Syb1, Syb2 and Syb3. Accordingly, by the strain resistance devices Syb1 to Syb3 and the signal lines 18 being isolated by the GND interconnections 15, when currents from the strain resistance devices Syb1 to Syb3 are being detected, disturbances caused by a.c. noise and environmental high-frequency noise are prevented by the GND interconnections 15. In this sense the GND interconnections 15 are called 'guard ring interconnections'. Because this isolation structure based on the GND interconnections 15 shields against cross-talk noise from other strain resistance devices and their signal lines, the SIN ratio of current measurement of resistance changes of the strain resistance devices caused by the piezoelectric effect can be increased.

Although in FIG. 3 and FIG. 4 guard rings surrounding the strain resistance devices Syb1, Syb2 and Syb3 individually have been shown, alternatively they may surround the strain resistance devices collectively. In this case also, disturbances caused by a.c. noise and environmental high-frequency noise can be prevented.

In FIG. 1, as mentioned above, each of multiple GND interconnections 15 is connected to a GND interconnection 13 formed over the surface region of the support part 3. A GND potential from an outside power source (not shown) is applied to the GND electrode pads 14 connected to this GND interconnection 13.

Each of the multiple signal lines 18 forming the interconnection pattern 10 (see FIG. 1) is connected to a corresponding signal electrode pad 16 formed on the surface of the periphery of the support part 3, as shown in FIG. 3. The multiple signal electrode pads 16 are electrode pads used for measuring the resistance values of the strain resistance devices and are connected to an outside electrical circuit for measurement or an external force analyzing apparatus which will be further discussed later. On the basis of this electrical circuit for measurement or external force analyzing apparatus, resistance values of the strain resistance devices are measured from current-voltage characteristics as will be further discussed later, and resistance change percentages of the strain resistance devices corresponding to the external force are obtained. The resistance values outputted in relation to the respective strain resistance devices Sxa1 to Sxa3, Sxb1 to Sxb3, Sya1 to Sya3 and Syb1 to Syb3 as shown in FIG. 2 are values on which temperature-compensation has been carried out on the basis of the outputs of the corresponding temperature-compensating resistance devices 11.

In the six-axis force sensor chip 1, the twelve temperature-compensating resistance devices 11 provided individually in correspondence with the twelve strain resistance devices Sxa1 to Sxa3, Sxb1 to Sxb3, Sya1 to Sya3 and Syb1 to Syb3 are disposed at the edges of the four corner parts 4B, which are non-deforming areas. The strain resistance devices Sxa1 to Sxa3, Sxb1 to Sxb3, Sya1 to Sya3 and Syb1 to Syb3 and the temperature-compensating resistance devices 11 are associated in a relationship of one-to-one correspondence.

Each of the twelve temperature-compensating resistance devices 11 is in state such that its temperature condition is substantially the same as that of the corresponding strain resistance device, and is formed on the surface of a peripheral part of a corner part 4B that does not deform even when the action part 4 receives an external force.

The connection relationship between the each of the temperature-comensating resistance devices 11 and the corresponding strain resistance device will be explained later with reference to FIG. 6.

By the measurement results of resistance changes of the resistance devices for external force measurement being corrected at all times on the basis of resistance changes of the temperature-compensating resistance devices 11 which do not undergo any influence of the external force, measurement of forces and moments unaffected by surrounding temperature is carried out.

The dummy resistance device 12 and the temperature-compensating resistance device 11a corresponding to this dummy resistance device 12 are provided on the corner part 4B positioned on the upper side in FIG. 2 of the bridge part 5Ba of the connecting part 5B. The dummy resistance device 12 is a monitoring device for making it possible to confirm at all times that temperature compensation is being carried out normally.

Figure 5A:
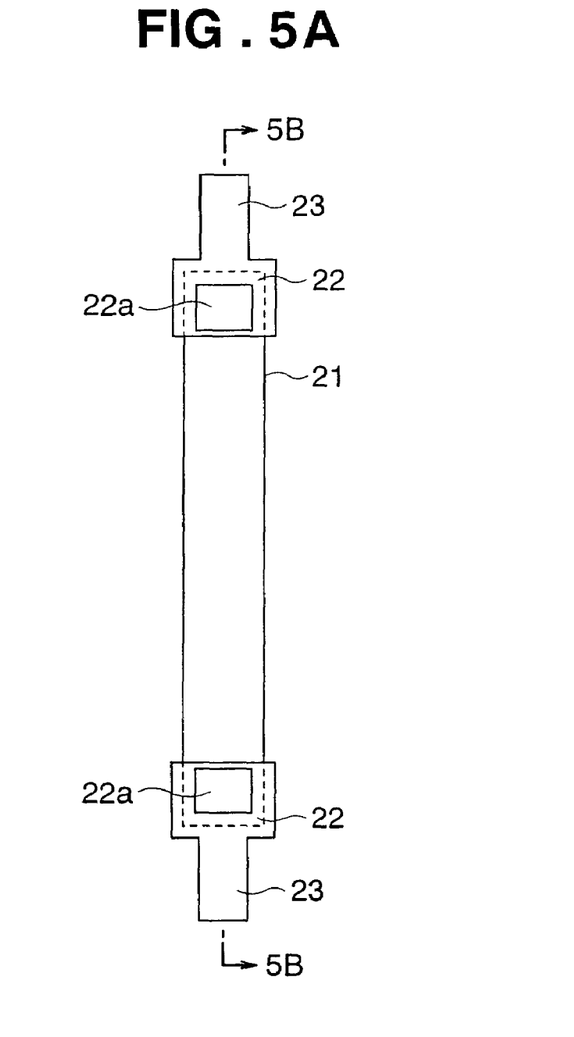
FIG. 5A and FIG. 5B are views showing a connection relationship between a resistance device and aluminum interconnections, FIG. 5B being a sectional view on the line 5B-5B in FIG. 5A.
Figure 5B:
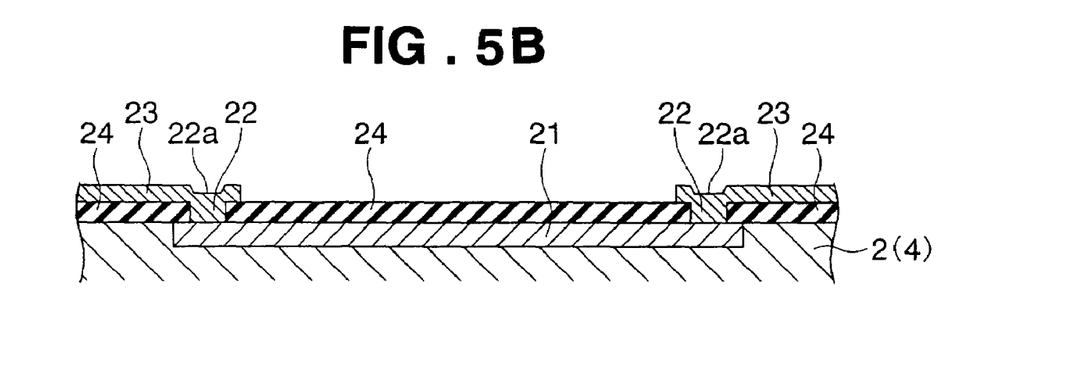

FIG. 5A and FIG. 5B show respectively a plan view and a partial sectional view of the resistance device constituting each of the strain resistance devices Sxa1 to Sxa3, Sxb1 to Sxb3, Sya1 to Sya3 and Syb1 to Syb3, the temperature-compensating resistance devices 11 and the dummy resistance device 12. In the plan view of FIG. 5A, just a positional relationship pertaining to the connection between a resistance device 21 and aluminum interconnections 23 is shown as a plan view.

The resistance device 21 is formed as an active layer on the surface of a predetermined location such as the action part 4 of the semiconductor substrate 2. The resistance device 21 has the shape of a rectangle as its plan shape, and its ends are connected to the aluminum interconnections 23 by interconnection joining portions 22. An insulating layer 24 is provided between the resistance device 21 and the aluminum interconnections 23, and parts other than the interconnection joining portions 22 are insulated. In the example shown in FIG. 5A and FIG. 5B, the aluminum interconnection 23 on the upper side is for example a signal interconnection, and the aluminum interconnection 23 on the lower side is for example a GND interconnection. An approximately square contact window 22a is formed at each of the interconnection joining portions 22. This is provided to electrically connect (ohmic contact) the active layer and the aluminum interconnection 23.

Here, a method for manufacturing the six-axis force sensor chip 1 will be described in outline. For example with respect to a semiconductor substrate of n-type silicon whose crystal plane is (100), boron, which is a p-type impurity, is ion-injected using a resist pattern for resistance device formation formed by photolithography as a mask. Resistance devices formed on the surface of the semiconductor substrate 2 are the strain resistance devices Sxa1 to Sxa3, Sxb1 to Sxb3, Sya1 to Sya3 and Syb1 to Syb3, the temperature-compensating resistance devices 11, 11a and the dummy resistance device 12.

After that, the resist pattern is removed and a silicon oxide film is grown as an interlayer insulating film by p-CVD (plasma Chemical Vapor Deposition). Then, by the semiconductor substrate 2 being heated, activation of the injected boron is carried out and the active layers mentioned above are formed.

After that, a resist pattern for forming contact holes is formed, and with this resist pattern as a mask the interlayer insulating film where the contact holes are to be formed is removed using BHF (buffered hydrofluoric acid). The resist pattern is then removed, Al or Al—Si (aluminum-silicon alloy) is sputtered over the entire surface of the semiconductor substrate 2, and a heat treatment for forming ohmic contact is carried out. By this means, contact between the various electrodes and the semiconductor substrate 2, and contact with the active layers, is formed.

After that, by photolithography, a resist pattern for forming the GND interconnections and the signal interconnections and electrode areas is formed, and patterning of the interconnections and electrodes is carried out by unwanted metal parts being removed by wet etching.

Then this resist pattern is removed, and by p-CVD a SiN film (silicon nitride film) is formed as a passivation film. After that, using a resist pattern, by RIE (Reactive Ion Etching), the substrate at the openings in the resist pattern are removed by etching to form holes A, B, C, D, K, L, M and N in the semi-conductor substrate 2, and then dicing is carried out to divide up the manufactured sensor chips (cut off the six-axis force sensor chips 1 from the wafer). An RIE etching process is sometimes substituted for the division of the sensor chips by dicing.

Next, the electrical connection relationships between the temperature-compensating resistance devices 11 and the corresponding strain resistance devices will be described on the basis of FIG. 6. In FIG. 6, a strain resistance device 25 is shown as an example of one of the strain resistance devices Sxa1 to Sxa3, Sxb1 to Sxb3, Sya1 to Sya3 and Syb1 to Syb3. Because the resistance value of this strain resistance device 25 changes in correspondence with the strain it undergoes, it has been drawn as a variable resistance device.

A temperature-compensating resistance device 11 and the strain resistance device 25 constitute half of a bridge circuit (a half bridge). The connection between the temperature-compensating resistance device 11 and the strain resistance device 25 is connected to the GND interconnection 13 by a GND interconnection 15.

The other end of the strain resistance device 25 is connected to a signal electrode pad 16 by a signal interconnection 18. The other end of the temperature-compensating resistance device 11 is also connected to a signal electrode pad 16 by a signal interconnection 18.

Figure 6:
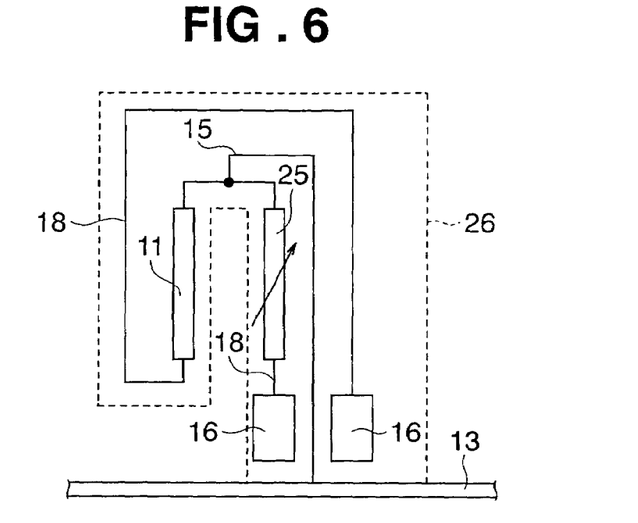
FIG. 6 is a view showing electrical connections of a single strain resistance device.

The dashed line 26 shown in FIG. 6 shows one of the above-mentioned guard ring interconnections based on a GND interconnection.

The wiring configuration of a temperature-compensating resistance device 11 and a strain resistance device 25 shown in FIG. 6 is applied to each of the strain resistance devices Sxa1 to Sxa3, Sxb1 to Sxb3, Sya1 to Sya3 and Syb1 to Syb3.

Figure 7:
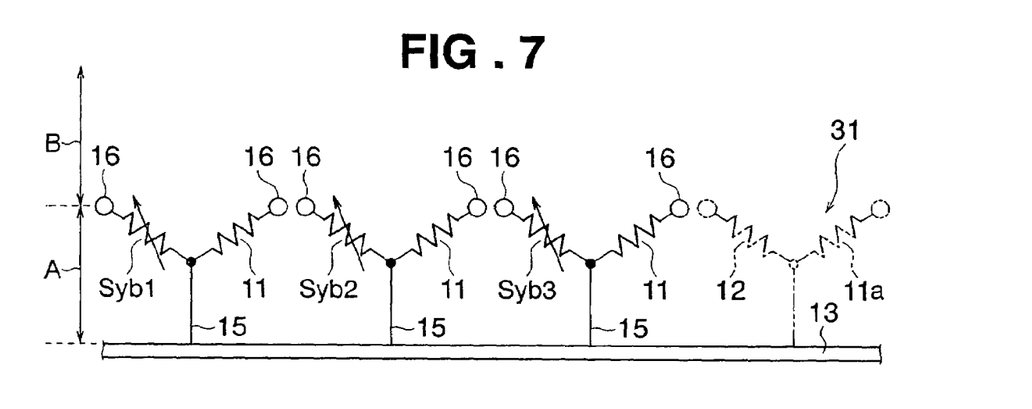
FIG. 7 is an electrical circuit diagram showing halves of bridge circuits.

FIG. 7 shows as an example the wiring configuration of the three strain resistance devices Syb1 to Syb3 formed on the bridge part 5Ca of the connecting part 5C shown in FIG. 2.

Each of the strain resistance devices Syb1 to Syb3 and its corresponding temperature-compensating resistance device 11 form the lower half circuit of a bridge circuit. The intermediate point between each of the strain resistance devices Syb1 to Syb3 and its corresponding temperature-compensating resistance device 11 is connected via a GND interconnection 15 to a GND inter-connection 13. The other terminals (upper terminals) of the strain resistance devices Syb1 to Syb3 and the other terminals (upper terminals) of the temperature-compensating resistance devices 11 correspond to the above-mentioned signal electrode pads 16.

In FIG. 7, the range A on the lower side of the upper terminals 16 of the lower halves of the bridge circuits indicates the electrical circuit part within the six-axis force sensor chip 1, and the range B on the upper side of the upper terminals 16 indicates the electrical circuit part outside the six-axis force sensor chip 1. Accordingly, outside electrical circuits are connected to the upper terminals, i.e. the signal electrode pads 16.

Figure 8:
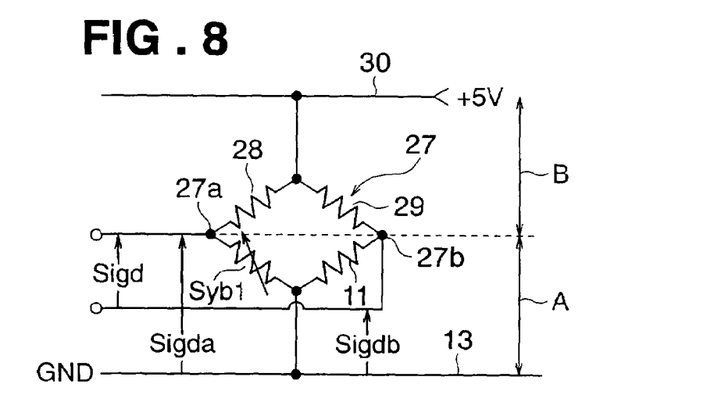
FIG. 8 is an electrical circuit diagram showing the whole of a bridge circuit.

FIG. 8 shows an example of a whole bridge circuit 27 with its outside circuit part connected.

The bridge circuit 27 is made up of for example the strain resistance device Syb1, a temperature-compensating resistance device 11, and two outside resistance devices 28, 29. The reference number 30 denotes a power supply interconnection carrying a power supply voltage of for example +5V.

A signal Sig d outputted from across the terminal 27a and the terminal 27b of the bridge circuit 27 is used as a detection signal. That is, a differential output Sig d between the terminal 27a and the terminal 27b of the bridge circuit 27 constitutes a detection signal. The differential output Sig d has had its temperature-dependent component canceled out by the bridge circuit 27. That is, the signal arising from strain detected by the strain resistance device Syb1 extracted by the bridge circuit 27 has been temperature-compensated by the temperature-compensating resistance device 11.

When as the strain resistance device Syb1 produces a signal pertaining to a strain caused by an external force it suffers the influence of a temperature change, because this temperature change also influences the temperature-compensating resistance device 11 with the same phase as the strain resistance device Syb1, as a result of the same-phase noise-canceling action of the bridge circuit the influence of the temperature change on the strain resistance device Syb1 is removed.

In FIG. 7, for reference, a bridge circuit 31 consisting of the dummy resistance device 12 and the temperature-compensating resistance device 11a is also shown, with broken lines, as an example. The electrical circuit relating to the dummy resistance device 12 also has basically the same circuit construction as those for the strain resistance devices Sxa1 to Sxa3, Sxb1 to Sxb3, Sya1 to Sya3 and Syb1 to Syb3.

And, in the bridge circuit 27 shown in FIG. 8, it is also possible to construct the resistance devices 28, 29 not as external resistance devices but as internal resistance devices included in the six-axis force sensor chip 1. In this case, the bridge circuit 27 included in the six-axis force sensor chip 1 is constructed as a whole circuit.

As described above, the six-axis force sensor chip 1 is made up of an action part 4 on which an external force acts, a support part 3 fixed to an external part, and four connecting parts 5A, 5B, 5C, and 5D disposed around the action part 4. The connecting parts 5A, 5B, 5C, and 5D are respectively made up of elastic parts 5Ab, 5Bb, 5Cb and 5Db connected to the support part 3 and bridge parts 5Aa, 5Ba, 5Ca, 5Da connected to the action part 4.

In the six-axis force sensor chip 1, when due to an external force applied to the action part 4 strains arise at the respective locations of the strain resistance devices Sxa1 to Sxa3, Sxb1 to Sxb3, Sya1 to Sya3 and Syb1 to Syb3 formed on the bridge parts 5Aa, 5Ba, 5Ca, 5Da, the elastic parts 5Ab, 5Bb, 5Cb and 5Db prevent the occurrence of strain in the semiconductor substrate 2 as a whole caused by the external force on the basis of their relationship with the forces acting between the action part 4 and the bridge parts 5Aa, 5Ba, 5Ca, 5Da. Consequently, with the six-axis force sensor chip 1, a selective strain respective to a force or moment of a specified direction can be made to arise in each of the strain resistance devices, and an external force applied to the action part 4 can be resolved into its components of force and moment.

For example, as shown in FIG. 1, when a three-dimensional orthogonal coordinate system 32 made up of an X axis, a Y axis and a Z axis with the centerpoint of the action part 4 of the six-axis force sensor chip 1 as its origin is defined, in connection with the three axes (X axis, Y axis, Z axis) of this orthogonal coordinate system, an X-axis direction force Fx, a Y-axis direction force Fy, a Z-axis direction force Fz, a moment Mx applied in a turning direction about the X axis, a moment My applied in a turning direction about the Y axis, and a moment Mz applied in a turning direction about the Z axis are each defined.

In a six-axis force sensor chip 1 formed with a semiconductor substrate 2 of the construction described above, even if a deformation occurs as a result of an external force applied to the action part 4, this external force can be resolved into components of force Fx, Fy, Fz and moment Mx, My, Mz, and the influence of other axis interference can be lowered.

Here, sensor characteristics of detecting the force and moment components applied to a six-axis force sensor chip 1 will be explained.

When the six axis components (axis forces) mentioned above, that is, Fx[N], Fy[N], Fz[N], Mx[N.cm], My[N.cm] and Mz[N.cm], are applied to a six-axis force sensor chip 1 on its own, the relationship between these six axis components and the detection signals produced by the six-axis force sensor chip 1 is as follows.

An actual six-axis force sensor is made up of a six-axis force sensor chip 1 of the kind described above and an external measuring instrument for computing signals pertaining to resistance change percentages obtained from the twelve strain resistance devices Sxa1 to Sxa3, Sxb1 to Sxb3, Sya1 to Sya3 and Syb1 to Syb3 of the six-axis force sensor chip 1.

The signals (computed resistance change percentages) finally outputted from the six-axis force sensor via the computations of the external measuring instrument are the six signals Sig 1, Sig 2, Sig 3, Sig 4, Sig 5 and Sig 6. If the values of the resistance change percentages obtained from the twelve strain resistance devices Sxa1 to Sxa3, Sxb1 to Sxb3, Sya1 to Sya3 and Syb1 to Syb3 in the six-axis force sensor chip 1, i.e. the percentage signal changes of the signals Sig d discussed with reference to FIG. 8, are respectively expressed as R'Sxa1, R'Sxa2, R'Sxa3, R'Sya1, R'Sya2, R'Sya3, R'Sxb1, R'Sxb2, R'Sxb3, R'Syb1, R'Syb2, R'Syb3, then the above-mentioned six signals Sig 1 to Sig 6 can be determined on the basis of the following expressions (1) to (6).

$$\text{Sig 1} = ((R'Sya1 - R'Sya3) + (R'Syb3 - R'Syb1))/4 \quad (1)$$

$$\text{Sig 2} = ((R'Sxa3 - R'Sxa1) + (R'Sxb1 - R'Sxb3))/4 \quad (2)$$

$$\text{Sig 3} = (R'Sxa2 + R'Sya2 + R'Sxb2 + R'Syb2)/4 \quad (3)$$

$$\text{Sig 4} = (R'Sya2 - R'Syb2)/2 \quad (4)$$

$$\text{Sig 5} = (R'Sxb2 - R'Sxa2)/2 \quad (5)$$

$$\text{Sig 6} = ((R'Sxa3 - R'Sxa1) + (R'Sya3 - R'Sya1) + (R'Sxb3 - R'Sxb1) + (R'Syb3 - R'Syb1))/8 \quad (6)$$

When the output signals of a six-axis force sensor with respect to an axis force with specified components are obtained and the relationship experimentally obtained between the six output signals Sig 1 to Sig 6 of the six-axis force sensor determined by the foregoing expressions (1) through (6) on the basis of levels of change of respective resistance change percentages of the twelve strain resistance devices and the six axis forces Fx, Fy, Fz, Mx, My, Mz, they can be associated by means of a certain matrix table (the matrix table shown in FIG. 13 of JP-A-2003-207405 previously submitted by the present applicants). In this matrix table, strain resistance devices are selected and used so that the non-diagonal components of the matrix become '0' or assume values relatively small compared with the diagonal components. That is, the foregoing expressions (1) through (6) are constructed so that to prevent other axis interference when forces and moments on the different axes are measured, strain resistance devices are selected and the computation of the computed resistance change percentages performed so that the resistance change percentages in forces and moments other than on the specified axes cancel each other out.

By applying the matrix given by the above-mentioned matrix table to the above-mentioned six output signals Sig 1 to Sig 6 obtained with the six-axis force sensor, it is possible to obtain the six axis forces Fx, Fy, Fz, Mx, My and Mz.

In the above, the resistance change percentage values R'Sxa1, R'Sxa2, R'Sxa3, R'Sya1, R'Sya2, R'Sya3, R'Sxb1, R'Sxb2, R'Sxb3, R'Syb1, R'Syb2, R'Syb3 of the twelve strain resistance devices Sxa1 to Sxa3, Sxb1 to Sxb3, Sya1 to Sya3 and Syb1 to Syb3, used for calculating the six output signals Sig 1 to Sig 6 obtained with the six-axis force sensor, are calculated using signals Sig d on which temperature compensation has already been carried out, as explained with reference to FIG. 8.

Figure 9:
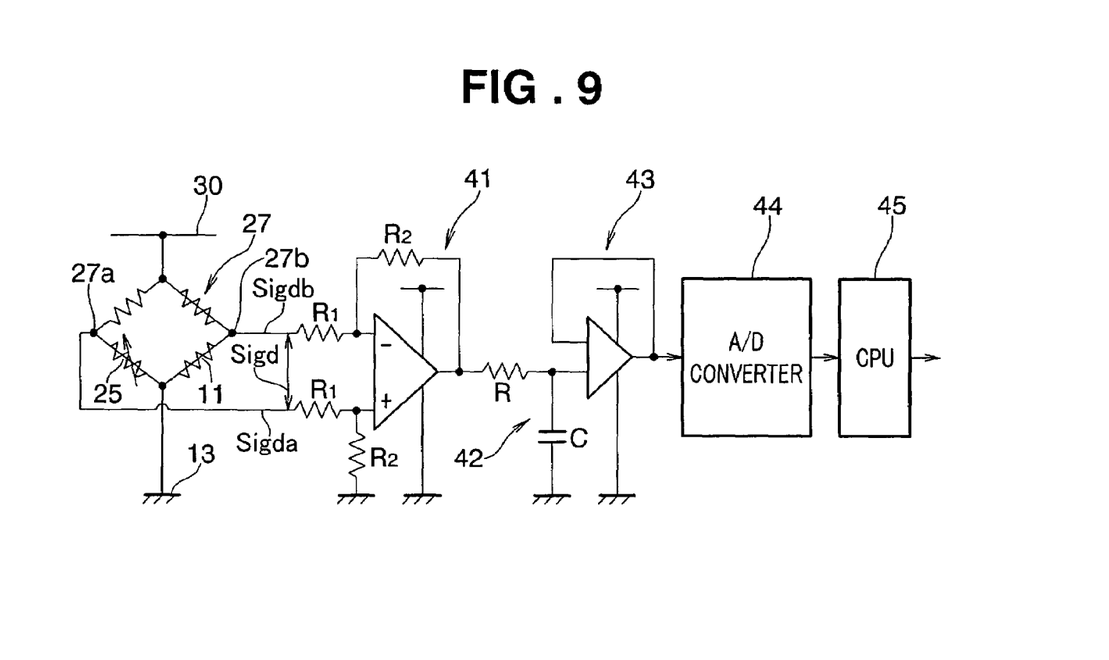
FIG. 9 is an electrical circuit diagram showing the whole of a signal-processing circuit including a bridge circuit.
Figure 10:
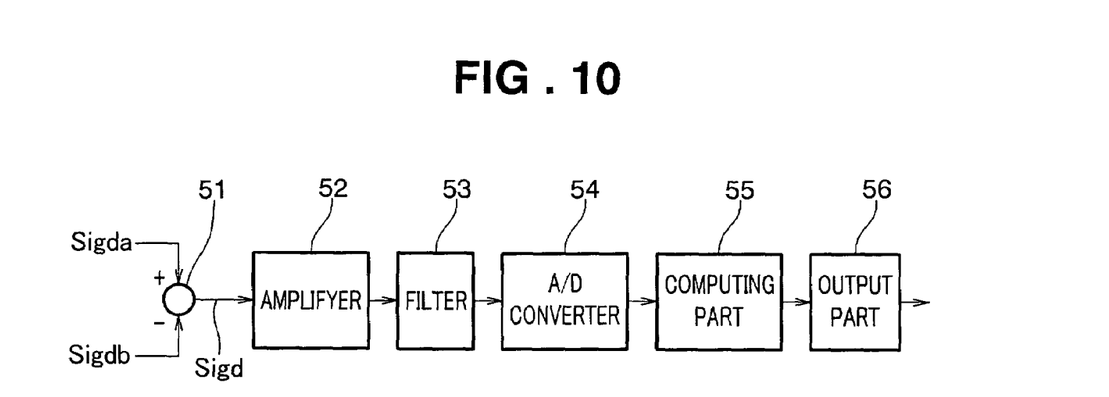
FIG. 10 is a block diagram showing with function blocks the signal-processing circuit shown in FIG. 9.

Next, with reference to FIG. 9 and FIG. 10, an example of a process of signal-processing the detection signals Sig d of the resistance devices outputted from the bridge circuits 27 respective to the twelve strain resistance devices Sxa1 to Sxa3, Sxb1 to Sxb3, Sya1 to Sya3 and Syb1 to Syb3 provided in the six-axis force sensor chip 1 will be described. FIG. 9 shows the whole of a signal-processing circuit of a six-axis force sensor, consisting of the bridge circuit 27 described above and an electrical circuit of an external measuring instrument. FIG. 10 shows this signal-processing circuit with a function block diagram.

The detection signal Sig d from the bridge circuit 27 is a voltage value. Although here the chip 1 shown in FIG. 1 includes only part of the bridge circuit 27 of FIG. 9, alternatively the other signal-processing circuitry shown in FIG. 9 and FIG. 10 may be integrated within the chip 1.

In FIG. 9, the bridge circuit 27 has its upper terminal connected to a power supply interconnection 30 and its lower terminal connected to the GND interconnection 13, and its left and right output terminals are connected to the inputs of a differential amplifier 41 consisting of an operational amplifier. A signal Sig da outputted from the output terminal 27a of the bridge circuit 27 is a strain signal pertaining to the strain resistance device 25 (for example Syb1). A signal Sig db outputted from the other output terminal 27b is a signal pertaining to the corresponding temperature-compensating resistance device 11.

The differential amplifier 41 inputs a temperature-compensated signal Sig d by taking the difference between the signal Sig da and the signal Sig db, and amplifies this detection signal. The output signal of the differential amplifier 41 (a voltage signal obtained by amplifying the detection signal Sig d) passes through a low-pass filter 42 for noise removal and an impedance converting circuit 43 for matching and is inputted to an A/D converter 44 and here converted into a digital value. The detected value converted into the digital value (corresponding to the temperature-compensated detection signal Sig d) is inputted to a CPU 45 for carrying out processing.

When the electrical circuit construction described above is shown as a function block diagram, it is as shown in FIG. 10. The difference between the signal Sig da pertaining to the strain resistance device 25 and the signal Sig db pertaining to the temperature-compensating resistance device 11 is obtained by a subtractor 51, which outputs the detection signal Sig d. The signal Sig d outputted from the subtractor 51 is amplified in an amplifying part 52. The functions of the subtractor 51 and the amplifying part 52 are realized by the above-mentioned differential amplifier 41. The output signal of the amplifying part 52 has noise removed from it by a filter part 53 and is then converted to a digital value in an A/D conversion part 54. After that, it is inputted to a computing part 55 and undergoes required computation before being outputted from an output part 56.

In the above, the filter part 53 is realized by the above-mentioned impedance converting circuit 43, the A/D conversion part 54 by the A/D converter 44, and the computing part 55 and the output part 56 by the CPU 45.

Next, with reference to FIG. 11 and FIG. 12, an example of a six-axis force sensor constructed using the six-axis force sensor chip 1 described above will be described.

A six-axis force sensor 61 is made up of a plinth 62, a cylindrical attenuating mechanism 63 and a six-axis force sensor chip 1.

The plinth 62 is a support stage part made of for example stainless steel (SUS). A sensor chip support part 62a is provided in the middle of the top face of the plinth 62, and an attenuating mechanism support part 62b is provided around the periphery of the top face. The six-axis force sensor chip 1 is mounted on the sensor chip support part 62a by way of a glass plinth 64. The reference number 65 denotes a bond layer or an adhesive layer for effecting connection. The attenuating mechanism 63 is mounted on the attenuating mechanism support part 62b by way of a bond part 66.

The attenuating mechanism 63 is a buffering mechanism for, when an external force is transmitted to the six-axis force sensor chip 1 via a connecting rod 67, weakening the external force transmitted to the six-axis force sensor chip 1. One example of the structure and shape of the attenuating mechanism 63 is as shown in external view in FIG. 11.

The connecting rod 67 transmits the external force received with the attenuating mechanism 63 to the six-axis force sensor chip 1. As shown in FIG. 11, an upper part of the connecting rod 67 is connected to the attenuating mechanism 63 by a bond part 68, and its lower end is connected to the linkage area 4C of the action part 4 of the six-axis force sensor chip 1 by an insulating bond part 69.

In a six-axis force sensor 61 constructed as described above, the external force received by the attenuating mechanism 63 is applied to the action part 4 of the six-axis force sensor chip 1 in a weakened state. Because the six-axis force sensor chip 1 is only subjected to an external force limited to a suitable size, it can detect the external force without breaking.

Also, by a glass plinth 64 being used for the part supporting the six-axis force sensor chip 1, because residual stress arising between the plinth 62 and the six-axis force sensor chip 1 is reduced, the reproducibility of the external force detecting performance increases and it is possible to carry out more highly accurate detection.

Figure 11:
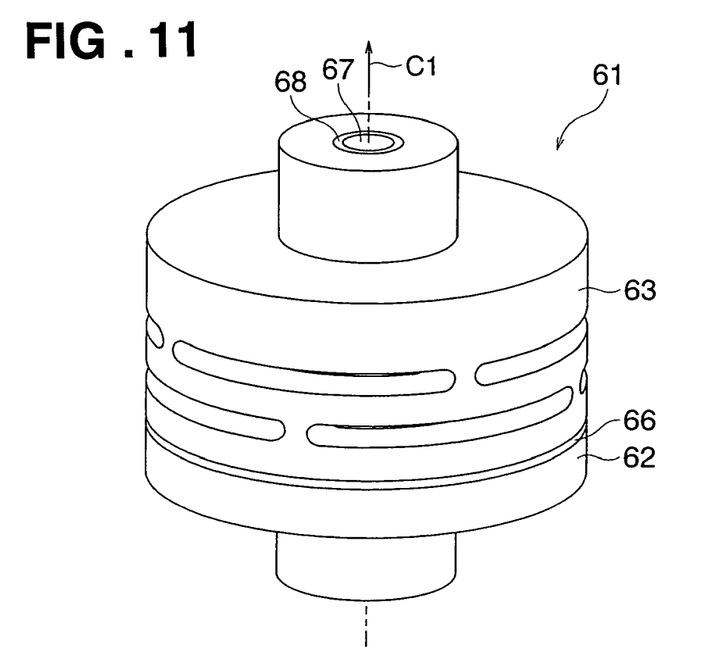
FIG. 11 is a perspective view showing a six-axis force sensor constituting a preferred embodiment of a multi-axis force sensor according to the invention.
Figure 12:
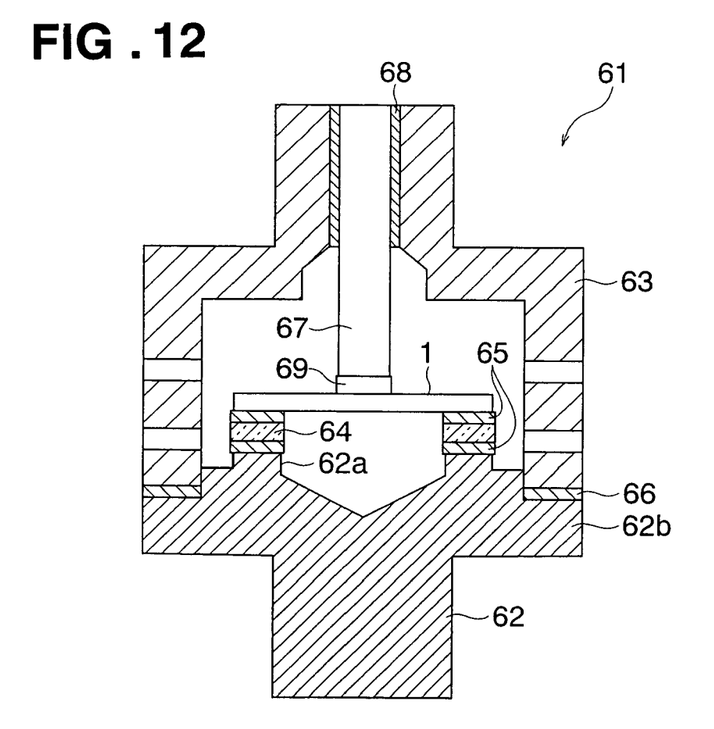
FIG. 12 is a sectional view of the six-axis force sensor shown in FIG. 11.

As the shape of the attenuating mechanism 63, for example it may be a cylinder formed with rotational symmetry about a vertical center axis C1 shown in FIG. 11, or it may be a rectangular parallelepiped conforming to the shape shown in FIG. 11 and FIG. 17 of JP-A-2003-254843 previously submitted by the present applicants.

Figure 13:
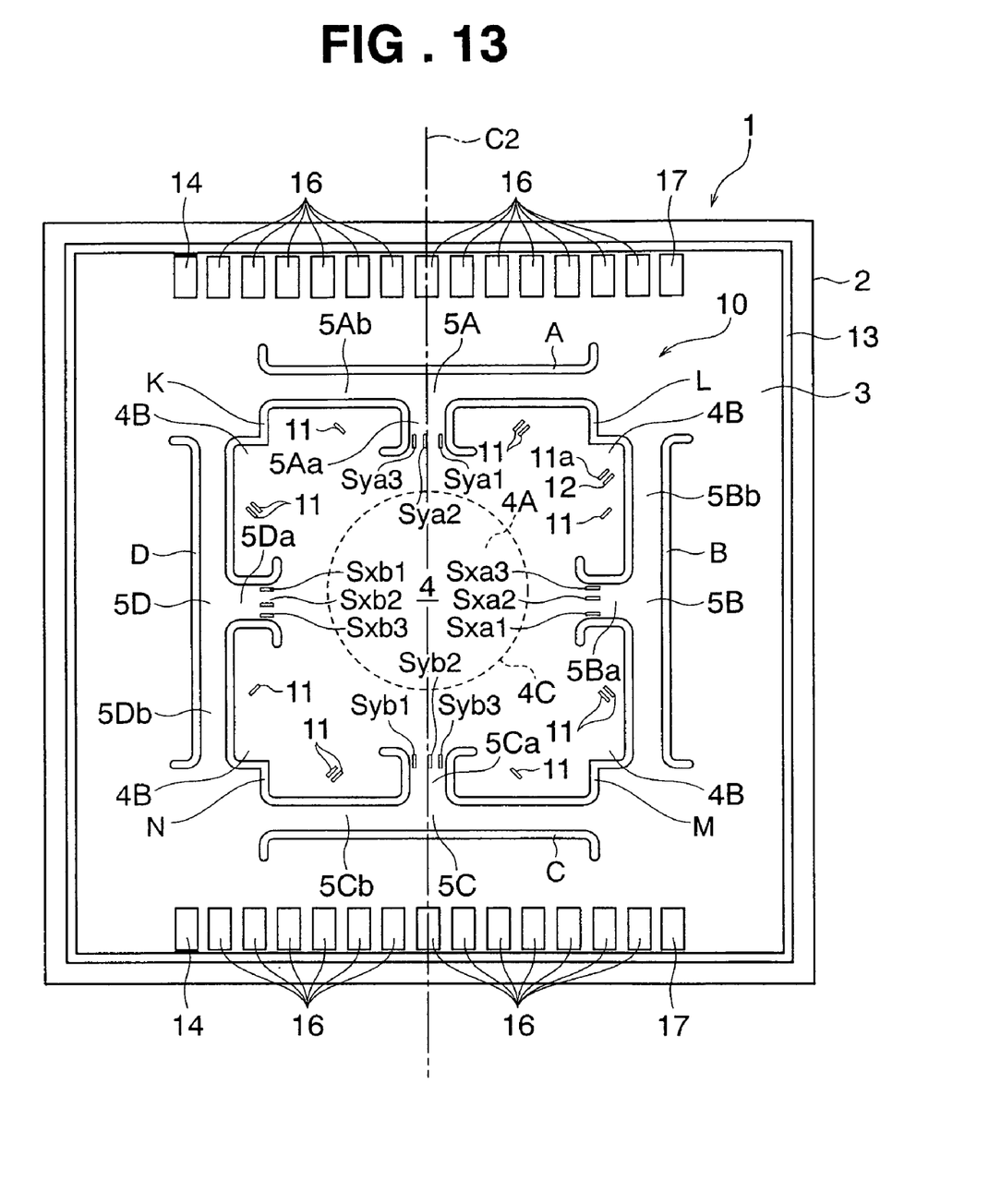
FIG. 13 is a is a plan view of a six-axis force sensor chip showing another preferred embodiment of an arrangement of temperature-compensating resistance devices and a dummy resistance device.

FIG. 13 shows another preferred embodiment of an arrangement of temperature-compensating resistance devices 11, 11a and a dummy resistance device 12.

The temperature-compensating resistance devices 11, 11a and the dummy resistance device 12 shown in this other preferred embodiment are all disposed slanting preferably at a slant angle of 45° with respect to the centerline C2 shown with a broken line in FIG. 13 and pointing in the direction of the center of the action part 4.

The arrangement of the strain resistance devices Sxa1 to Sxa3, Sya1 to Sya3, Sxb1 to Sxb3 and Syb1 to Syb3 and the temperature-compensating resistance devices 11, 11a shown in FIG. 13 is decided taking into account the crystal orientation of the semiconductor substrate 2. That is, because the surface of the silicon wafer has a crystal orientation of <100>, the temperature-compensating resistance devices 11, 11a and the dummy resistance device 12 are made to slant at 45° with respect to the long sides of the strain resistance devices Sxa1 to Sxa3, Sya1 to Sya3, Sxb1 to Sxb3 and Syb1 to Syb3 as shown in FIG. 13 so that the π coefficient (piezo coefficient) is effectively used and compared to the strain sensitivity of the temperature-compensating resistance devices 11, 11a the strain sensitivity of the strain resistance devices Sxa1 to Sxa3, Sya1 to Sya3, Sxb1 to Sxb3 and Syb1 to Syb3 becomes markedly higher. This is, as an example, the direction such that the long sides of the strain resistance devices Sxa1 to Sxa3, Sya1 to Sya3, Sxb1 to Sxb3 and Syb1 to Syb3 assume a crystal orientation of <110>, and is the direction such that the long sides of the temperature-compensating resistance devices 11, 11a and the dummy resistance device 12 assume a crystal orientation of <100>.

Although in FIG. 13 an example is shown wherein the temperature-compensating resistance devices 11, 11a and the dummy resistance device 12 are disposed so as to point to the center of the action part 4, alternatively the orientation of the temperature-compensating resistance devices 11, 11a and the dummy resistance device 12 may be made different by 90° from the orientation shown in FIG. 13.

With the disposition shown in FIG. 13, the piezo coefficient of the temperature-compensating resistance devices 11, 11a becomes the lowest and their strain sensitivity becomes low, and as a result it becomes possible to reduce further the influence of stress noise and a six-axis force sensor chip 1 with higher measurement accuracy is realized.

Although in this preferred embodiment an example has been shown in which three strain resistance devices are disposed on each bridge part (12 channels altogether), the invention is not limited to this configuration, and as long as there are at least two it is sufficient. For example, when two strain resistance devices are provided on each bridge part (8 channels altogether), in FIG. 1 and FIG. 2 the strain resistance devices Sxa2, Sxb2, Sya2 and Syb2 are eliminated and in correspondence with that the number of temperature-compensating resistance devices 11 also decreases. With this configuration also, it is possible to realize a six-axis force sensor having the same detection function.

Also, the guard ring interconnections are not limited to those shown in FIG. 1 to FIG. 4. Various variations can be employed, taking into account noise-shielding effect and deterioration in sensor accuracy arising from thermal expansivity difference between the semiconductor substrate and the inter-connections.

The constructions, shapes, sizes and configurations described above have only been shown roughly, to a level such that the invention can be understood and worked, and the numerical values and compositions (materials) of constituents are no more than examples. Accordingly, the present invention is not limited by the preferred embodiments described, and various changes can be made without deviating from the scope of the technological ideas shown in the claims.

For example, the guard ring interconnections mentioned above may be dispensed with. The various interconnections may be made fine interconnections. By making the interconnections fine like this, it is possible to obtain an effect of stress reduction of the interconnection films.

As described above, the present invention will be utilized in high-accuracy stress detection by being used in six-axis force sensors and the like in which temperature compensation is carried out exactly when an external force or a load acts and highly accurate stress detection can be carried out.

Obviously, various minor changes and modifications of the present invention are possible in the light of the above teaching. It is therefore to be understood that within the scope of the appended claims the invention may be practiced otherwise than as specifically described.

What is claimed is:

1. A multi-axis force sensor chip comprising:
a base member comprising an action part adapted to receive an external force, a support part supporting the action part, and connecting parts connecting the action part to the support part, the support part being disposed to surround the action part and separated from the action part by first holes, the action part having an external force action area part to which the external force is applied, and non-deforming area parts which remain undeformed even when the external force acts on the external force action area part, the non-deforming area parts being formed as free ends of the action part that face away from the external force action area part and are surrounded by first holes;
strain resistance devices provided on deforming parts of the connecting parts; and
temperature-compensating resistance devices provided on the non-deforming area parts of the action part in positions that are between the action part and the first holes.

2. A sensor chip according to claim 1, wherein the base member is a semiconductor substrate.

3. A sensor chip according to claim 1, wherein the temperature-compensating resistance devices are provided on the non-deforming area parts in locations having temperature conditions equal to those of the deforming parts of the connecting parts.

4. A sensor chip according to claim 1, wherein the action part has a plan shape similar to a square having four sides, and four resistance device groups are provided, each of the four resistance device groups being made up of a subset of the strain resistance devices and a subset of the temperature-compensating resistance devices, and each of these four resistance device groups is disposed in correspondence with one of the four sides of the action part.

5. A sensor chip according to claim 4, wherein the strain resistance devices constituting each of the four resistance device groups are provided in a positional relationship of point symmetry about a center of the action part and substantially the same distance from that center.

6. A sensor chip according to claim 4, wherein the four resistance device groups made up of the subset of the strain resistance devices and the subset of the temperature-compensating resistance devices are provided in a positional relationship of point symmetry about a center of the action part and substantially the same distance from that center.

7. A sensor chip according to claim 4, wherein each of the four resistance device groups comprises at least two identical ones of the strain resistance devices and the temperature-compensating resistance devices provided in correspondence with the number of these strain resistance devices.

8. A sensor chip according to claim 7, wherein each of the four resistance device groups comprises three identical ones of the strain resistance devices and the three identical temperature-compensating resistance devices.

9. A sensor chip according to claim 1, wherein the temperature-compensating resistance devices are disposed at a slant of 45° with respect to a centerline of the base member.

10. A sensor chip according to claim 1, wherein each of the strain resistance devices and a corresponding one of the temperature-compensating resistance devices are connected so as to form a half a bridge circuit or a whole bridge circuit.

11. A sensor chip according to claim 10, further comprising differential amplifying parts each for amplifying a difference signal between an output signal from the strain resistance device and an output signal from the temperature-compensating resistance device outputted from a respective one of the bridge circuits.

12. A sensor chip according to claim 1, wherein each of the first holes surrounding a respective one of the non-deforming area parts is formed to substantially W-shaped, each of the W-shaped holes having long sides extending parallel to two adjoining ones of the multiple sides to the chip,
the temperature-compensating resistance devices being provided in positions that are between the two longs sides of each of the W-shaped holes.

13. A sensor chip according to claim 1, wherein the connecting parts are generally T-shaped, each of the T-shaped connecting parts having a bridge part forming a stem of the T-shaped connecting part and connected to the action part, and an elastic part forming a head of the T-shaped connecting part and connected to the support part, and wherein the base member further includes second holes each extending along the head of a corresponding one of the T-shaped connecting parts, the stem portion of each of the T-shaped connecting parts being disposed between two adjacent ones of the first holes.

14. A sensor chip according to claim 1, further comprising signal connections connected at first ends thereof to the strain resistance devices and connected at second ends thereof to electrode parts, the strain resistance devices being provided at four positions in a radial direction around the action part, and the electrode parts being provided adjacent to only two of four peripheral edges of the sensor chip.

15. A multi-axis force sensor comprising:

a multi-axis force sensor chip comprising a base member comprising an action part adapted to receive an external force, a support part supporting the action part, and connecting parts connecting the action part to the support part, the support part being disposed to surround the action part and separated from the action part by first holes, the action part having an external force action part to which the external force is applied, and non-deforming area parts which remain undeformed even when the external force acts on the external force action area part, the non-deforming area parts being formed as free ends of the action part that face away from the external force action area part and are surrounded by first holes; strain resistance devices provided on deforming parts of the connecting parts; and temperature-compensating resistance devices provided on the non-deforming area parts of the action part in positions that are between the action part and the first holes;

a support plinth for supporting the multi-axis sensor chip by supporting the support part with a glass plinth;

transmitting means for applying an external force to the external force action area part of the action part; and an attenuating mechanism for attenuating the external force.

16. A sensor according to claim 15, wherein the attenuating mechanism has a shape with rotational symmetry about a center axis thereof.

17. A sensor according to claim 16, wherein the attenuating mechanism has a cylindrical shape.

18. A sensor according to claim 15, wherein the base member is a semiconductor substrate.

19. A sensor according to claim 15, wherein the temperature-compensating resistance devices are provided on the non-deforming area parts in locations having temperature conditions equal to those of the deforming parts of the connecting parts.

20. A sensor according to claim 15, wherein the action part has a plan shape similar to a square having four sides, and four resistance device groups are provided, each of the four resistance device groups being made up of a subset of the strain resistance devices and a subset of the temperature-compensating resistance devices, and each of these four resistance device groups is disposed in correspondence with one of the four sides of the action part.

21. A sensor according to claim 20, wherein the strain resistance devices constituting each of the four resistance device groups are provided in a positional relationship of point symmetry about a center of the action part and substantially the same distance from that center.

22. A sensor according to claim 20, wherein each of the four resistance device groups is made up of the subsets of the strain resistance devices and the subsets of the temperature-compensating resistance devices are provided in a positional relationship of point symmetry about a center of the action part and substantially the same distance from that center.

23. A sensor according to claim 20, wherein each of the four resistance device groups comprises at least two identical ones of the strain resistance devices and the temperature-compensating resistance devices provided in correspondence with the number of these strain resistance devices.

24. A sensor according to claim 23, wherein each of the resistance device groups comprises three identical ones of the strain resistance devices and three identical ones of the temperature-compensating resistance devices.

25. A sensor according to claim 15, wherein the temperature-compensating resistance devices are disposed at a slant of 45° with respect to a centerline of the base part.

26. A sensor according to claim 15, wherein each of the strain resistance devices and a corresponding one of the temperature-compensating resistance devices are connected so as to form a half a bridge circuit or a whole bridge circuit.

27. A sensor according to claim 26, further comprising differential amplifying parts each for amplifying a difference signal between an output signal from the strain resistance device and an output signal from the temperature-compensating resistance device outputted from a respective one of the bridge circuits.

28. A sensor according to claim 15, wherein each of the first holes surrounding the non-deforming area parts is formed to substantially W-shaped, each of the W-shaped holes having two long sides extending parallel to two adjoining ones of the multiple sides of the chip, the temperature-compensating resistance devices being provided in positions that are between the two longs sides of each of the W-shaped holes, the temperature-compensating resistance devices being provided in positions that are between the longs sides of each of the W-shaped holes.

29. A sensor chip according to claim 15, wherein the connection parts are generally T-shaped, each of the T-shaped connecting parts having a bridge part forming a stem of the T-shaped connecting part and connected to the action part, and an elastic part forming a head of the T-shaped connecting part and connected to the support part, and wherein the base member further includes second holes each extending along the head of a corresponding one of the T-shaped connecting parts, the stem portion of each of the T-shaped connecting parts being disposed between two adjacent ones of the first holes.

30. A sensor chip according to claim 15, further comprising signal connections connected at first ends thereof to the strain resistance devices and connected at second ends thereof to electrode parts, the strain resistance devices being provided at four positions in a radial direction around the action part, and the electrode parts being provided adjacent to only two of four peripheral edges of the sensor chip.

* * * * *